3,288,756
OXYMETHYLENE POLYMERS

Gerard Dunstan Buckley, Hitchin, England, assignor to Imperial Chemical Industries Limited, London, England, a corporation of Great Britain
No Drawing. Filed Dec. 31, 1962, Ser. No. 248,266
Claims priority, application Great Britain, Jan. 5, 1962, 474/62
6 Claims. (Cl. 260—67)

The present invention relates to a process for the preparation of oxymethylene polymers and to the oxymethylene polymers so prepared.

Oxymethylene polymers, sometimes known as polyoxymethylenes, are polymers having repeating units of the structure —O—$CH_2$— and may be derived, for example, from the polymerisation of formaldehyde or its cyclic trimer, trioxane, as described in B.P. 748,836 and B.P. 877,820. The polyoxymethylenes prepared by normal homopolymerisation processes generally contain terminal oxymethylene hydroxide (—$OCH_2OH$) groups and have been found to be subject to degradation on heating at even quite moderate temperatures. In order to overcome this undesirable characteristic it has been proposed to react the hydroxyl end groups with compounds that will substitute for the relatively unstable hydroxyl group, an end group which is more stable, such as an acetate, ether or urethane group.

We have now found that useful high molecular weight oxymethylene polymers of good stability may be prepared by polymerising a cyclic oligomer of formaldehyde in the presence of methacrolein dimer.

According to the present invention, we provide a copolymer comprising the product of polymerising a cyclic oligomer of formaldehyde, preferably trioxane, with methacrolein dimer.

Methacrolein dimer has a boiling point of 67–68° C. at 20 mm. of mercury and shows two infra-red absorption peaks at 1734 cm.$^{-1}$ and 1669 cm.$^{-1}$. It shows the customary reactions of a compound containing ethylenic unsaturation and of a compound containing an aldehyde group. It is thought to have the structure

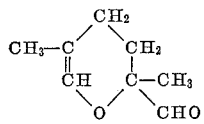

Of the cyclic oligomers of formaldehyde, we prefer trioxane because of its ready availability. Tetraoxymethylene is an example of another such cyclic oligomer.

In order to obtain products of good physical properties, it is preferred that the copolymers contain more than 50% molar of oxymethylene (O—$CH_2$—) units, preferably at least 80% molar. Copolymers containing at least 90% molar of such suits are tough, rigid and very suitable for moulding. We prefer that the copolymer contains at least 0.1% molar and preferably at least 0.5% molar of units other than oxymethylene units since the presence of smaller amounts of these units has not, in general, sufficient effect upon the thermal stability of the copolymer. Copolymers containing from 1.5 to 5 molar percent of such units have very useful stability and rigidity and are good moulding materials.

Copolymers containing more than 20% of these units tend to have substantially reduced rigidity and softening point and, as the amount of these units in the copolymers increases, tend to become waxy. These copolymers are suitable as plasticisers, lubricants and additives for lubricants and viscosity depressants.

Particularly useful polymers are obtained when their molecular weight is at least 15,000 and preferably 20,000 or more. A molecular weight of 20,000 is approximately equivalent to an inherent viscosity of 1.0 as measured as a 0.5% solution in p-chlorophenol containing 2% of α-pinene at 60° C.

Further according to the present invention we provide a process for the preparation of high molecular weight oxymethylene polymers which comprises polymerising together a cyclic oligomer of formaldehyde and methacrolein dimer in the presence of an electrophilic catalyst and in the presence of no more than a very small amount of water.

Infra-red analysis shows that the methacrolein dimer copolymerises largely through its double bond and not through the carbonyl group and therefore the process of the invention is a useful method for inserting into the polymer chain carbonyl groups the presence of which allows the polymer to be chemically modified, for example by cross-linking. Suitable cross-linking agents include diamines such as hexamethylene diamine or triethylene tetramine or a diphenyl hydrazine. The presence of the carbonyl groups also encourages the adhesion of films formed from the polymer to other materials such as metals to form strong protective coatings.

The polymerisation may be effected in bulk or in solution.

Where a bulk process is used, the polymerisation is normally carried out at a temperature at which the polymerisable material is in a molten or substantially molten form. However, for the preparation of high molecular weight polymers, e.g., polymers of molecular weight greater than 15,000 the polymerisation temperature should not be so high as to allow substantial depolymerisation to occur. It is preferred, on the other hand, that a temperature is used at which methacrolein dimer is soluble in trioxane.

It is preferred to effect the polymerisation at temperatures of from about 0° to about 100° C. and preferably 50–90° C. but higher temperatures may be used if desired. Where the polymerisation is effected under conditions of shear, for example in a mixer, it is often desirable to use polymerisation temperatures as high as 110° C. Where it is desired to use temperatures of above about 115° C. (the boiling point of trioxane) the polymerisation should be carried out under super-atmospheric pressure.

Where the polymerisation is effected in solution, suitable solvents include hydrocarbons such as hexane, heptane, cyclohexane, benzene, toluene and xylene and chlorinated hydrocarbons such as methylene chloride, chloroform or carbon tetrachloride. It is preferred to effect the polymerisation at a temperature high enough to prevent the polymerisable compound from crystallising out of solution but at a temperature not above the boiling point of the solution at the working pressure. The polymerisation may be effected under super-atmospheric pressure if desired and this is useful since it permits higher temperatures to be used.

The polymerisation may take place satisfactorily in the presence of very small amounts of water such as would be found as impurities in the oligomer or methacrolein dimer but if good yields of high molecular weight material are to be obtained it is preferred to remove substantially all traces of water from the polymerisation medium. We prefer that the polymerisation medium contains less than 0.05% by weight of water, more preferably less than 0.03%.

Any electrophilic catalyst may be used in the polymerisation and examples of these are Lewis acids, Friedel-Craft catalysts, elementary iodine, perchloric acid and acetyl perchlorate. Of these, Lewis acids which are halides are preferred and boron trifluoride in particular has been found to give very good results. The boron trifluoride may be used in unmodified form or as one of its complexes; examples of such complexes include those with water, with organic compounds having an oxygen or sulphur atom which may act as the donor atom (e.g., alcohols, ethers, acids and their sulphur analogues), with organic compounds having a trivalent nitrogen or phosphorous atom (e.g., amines and phosphines) and fluoborate complexes such as those with diazonium compounds. The amount of catalyst used is generally from 0.0001 to 0.1 part by weight of active constituent per 100 parts by weight of monomeric material when it is desired to form high molecular weight products suitable for moulding and similar processes.

The molecular weight of the products of the invention may be controlled by adding chain transfer agents to the polymerisation medium, suitable chain transfer agents being chlorinated hydrocarbons, alkyl acetates and acetals. It is preferred to effect the polymerisation in the substantial absence of oxygen.

We prefer that the polymerisation is effected in bulk or in the presence of only very small amounts of solvent since then the necessity of expensive solvent extraction and recovery processes may be avoided.

In a process according to our invention, methacrolein dimer and trioxane are first carefully dried and are then added to a predried reactor such as a steel bomb. The container may be swept with nitrogen gas and the catalyst is then added alone or as a solution in an inert organic solvent. The container is sealed and heated to about 65° C. and the polymerisation is allowed to take place. After the required time, the polymerisation is brought to a conclusion and the reactor will contain the polymeric products and catalyst residues and possible unreacted trioxane and unreacted methacrolein dimer.

In the production of high polymers as described above the polymerisation temperature is normally less than the softening point of the polymers. As the polymers formed are usually insoluble in the mixture of monomers, the product of a bulk polymerisation process is usually a crumbly mass. To ensure good mixing of the polymerisation and so full growth of the polymer chains, and to form an easily worked powder at the end of the polymerisation, it is desirable to apply shear to the polymerisation mixture during the bulk process.

Conditions of shear may be imposed by any suitable means, such as intense stirring or agitation and the polymerisation may, for example, be carried out in a simple mixer. A vessel rotatable on a horizontal axis and having within it freely rolling spheres, rods or the like as described in the specification of British Patent No. 749,086 may also be used.

Very good results may be obtained if the polymerisation ingredients are fed into a continuous mixer having a screw with an interrupted thread placed in a cylindrical body the inside surface of which has rows of protruding teeth. The screw is made both to rotate and reciprocate so that the teeth on the wall of the cylindrical body pass through the breaks in the screw thread. In this case the polymerisation mass moves forward along a path which has a generally helicoidal shape with an alternate forward and backward movement as it moves towards the outlet. The use of this mixer also has the advantage in that a continuous process may be used. A suitable machine is described in the specification of British Patent No. 626,067. A sigma-bladed mixer is also suitable.

Therefore, in another process according to the invention methacrolein dimer and trioxane are first carefully dried and then added together with the catalyst to the pre-dried mixer which is heated to the desired temperature. The polymerisation takes place in the mixer which may be pressurised if desired and the polymer is removed from the mixer in the form of a slurry or powder.

The material so obtained will contain the polymeric product, catalyst residues and possibly unreacted trioxane and unreacted methacrolein dimer; the poymeric product comprises the copolymer of trioxane and methacrolein dimer and possibly incidental polyoxymethylenes derived from the homopolymerisation of the trioxane. The catalyst residues are preferably removed as soon after the polymerisation as possible since their presence may also catalyse the decomposition of the polymeric product; they may be removed simply by washing the mix with an aqueous, preferably an aqueous alkaline wash. For example, the mix may be washed with a dilute ammoniacal or caustic soda solution. As is well known, solvents may also be used for removing these catalysts. During their removal the polymer may also be stabilised as is set out below.

The unreacted trioxane and any of the methacrolein dimer may be separated from the copolymer by any suitable means such as filtration or solvent extraction. Since trioxane is soluble in most common solvents, it may be separated by a solvent extraction process, e.g., at the same time as the catalyst is removed. The methacrolein dimer may also be extracted by a solvent extraction process.

The presence of the incidental polyoxymethylene may adversely affect the stability of the material and this may be remedied either by preferential destruction or by end-group stabilisation of this polyoxymethylene.

The copolymers prepared by the process of the invention contain both oxymethylene groups derived from the trioxane and divalent organic radicals derived from methacrolein dimer and the copolymer chains may therefore be ended by terminal groups of the structure $-O-CH_2OH$ or they may be ended by other groups derived from methacrolein dimer. Where a copolymer chain is terminated by a $-O-CH_2OH$ group, which is readily detachable on heating or under alkaline conditions, the end of the chain may be represented as having the structure $$-R-O-(CH_2O)_nH$$

where $n$ is a whole number and R is the divalent radical derived from methacrolein dimer and nearest to the end of the polymer chain. On subjecting the copolymer chain to a thermal or alkaline degradation reaction, the $-O-CH_2OH$ group will be detached and the oxymethylene group immediately behind it (if any) will receive a hydrogen atom and become an $-O-CH_2OH$ group and the chain will now have the structure $$-R-O-(CH_2O)_{n-1}H$$

This next $-O-CH_2OH$ group is now attacked and the degradation of the chain will continue until the $-R-O-$ group is reached. Since the $-R-OH$ group is relatively much more resistant to detachment, the degradation reaction will normally halt there. The copolymer may therefore be stabilised either by subjecting it to such a degradation reaction or by end-group stabilising it. It will be appreciated that under such degradation conditions, any homopolyoxymethylene that may be present will eventually be degraded completely if conditions are sufficiently forcing.

Where it is preferred to destroy the incidental polyoxymethylene and to remove the unstable oxymethylene end-groups from the copolymer, this may be done simply by heating the mixture in an inert atmosphere, e.g., under nitrogen at a temperature of about 160° C. or above after the catalyst residues have been removed; it is preferred not to use too high a temperature since otherwise the copolymer may also be degraded to an undesirable extent. The preferential destruction may also be aided by the addition of a weak acid such as formic acid or acetic acid or an alkali such as caustic soda but the latter is not to be preferred as it may tend to cause undesirable degradation of the copolymer and may convert the formaldehyde so generated into sugar-like polymers.

Stabilisation by removal of these unstable entities may be carried out in an alkaline process for removing the polymerisation catalyst and in this preferred process, the polymer is treated with a basic, preferably ammoniacal, solution at moderately elevated temperatures. However, it is believed that the action of the basic solution may be merely topochemical (see, for instance, pages 231 and 232 of Die Hochmolekularen Organischen Verbindungen by Staudinger, 1932) and for an efficient reaction the polymer is preferably treated either in a finely divided state or, more preferably, in solution and the formation of a solution may be encouraged by carrying out the process under elevated pressure and temperature. The advantage of such a process is that in one step the catalyst, unreacted trioxane and incidental homopolyoxymethylenes may all be removed from the polymer. When the solution is cooled, the desired stable oxymethylene copolymer comes out of solution and may be separated.

Instead of a strong, ammoniacal solution, a solution of an amine, or an amide or an alkali hydroxide such as sodium or potassium hydroxide or a salt of a strong base and weak acid such as sodium carbonate or sodium acetate may be used alone or in combination under similar conditions. The solvent may be water or preferably a mixture of water with a water-miscible alcohol (particularly methanol), with a water-miscible ketone such as acetone or with an ether. The presence of the organic material helps to bring the polymeric material into solution.

When on the other hand it is preferred to end-group stabilise the incidental homopolyoxymethylene and the oxymethylene end-groups of the copolymer, the mixture may be reacted with any suitable compound which will substitute for the terminal hydroxyl group of the polyoxymethylene or copolymer other groups (such as acetate, ether or urethane groups) which are relatively more stable. The end-group stabilisation may be effected for example, by reacting the copolymer mixture with a carboxylic acid, a carboxylic acid ester, a carboxylic acid anhydride, an alcohol, an acetal, an isocyanate, an ortho ester, a ketal, an ortho carbonate, a ketone, a ketene/ketone transformation product, an ether or their substituted derivatives, an epoxide such as ethylene oxide or propylene oxide, an olefine such as butadiene or styrene, an alkyl halide such as tertiary butyl chloride or a vinyl monomer such as acrylonitrile or acrolein. Reaction with a carboxylic acid anhydride such as acetic anhydride is preferred.

The copolymer may be further stabilised against degradation by the addition of any suitable stabiliser for the polyoxymethylene. Suitable stabilisers include, for example, hydrazines, amines, amidines, amides, polyamides, phenols, substituted phenols, polynuclear phenols (particularly alkylene bis-phenols), ureas, thioureas, quinones such as those described in our copending applications Nos. 41,039/61 and 3,474/62 and certain aromatic nitro compounds such as those described in our copending application number 3,473/62, alone or in combination. Stabilisers against attack by ultra violet light, such as hydroxy-substituted benzophenones, may also be incorporated into the polymer. Fillers, pigments, mould release agents, lubricants, plasticisers, and the like may also be added and the polymer may be blended with other compatible polymeric materials.

The copolymers of the present invention differ from the products of homopolymerising trioxane. The melting points of the copolymers are lower than that of the crystalline homopolymer and the drop in melting point increases with increase in the amount of methacrolein dimer residue in the copolymer.

Also, the melting points of the copolymers are less sharp than that of the homopolymer and the decrease in definition becomes more marked as the amount of methacrolein dimer residue in the copolymer increases. For example, the homopolymers of trioxane have a crystalline melting point of 170° C. and the copolymer of trioxane and methacrolein dimer containing 2.7 mole percent of units derived from the dimer as measured by infra-red analysis has a melting range of 140 to 162° C. Similarly, a copolymer containing 5.0 mole percent of the units has a melting range of 121 to 147° C., where the first temperature is that at which 50% of the copolymer is molten and the last temperature is that at which the whole specimen is molten.

The large drop in melting point of the copolymers and the wide melting range both indicate that the copolymers are of the random variety and are not block copolymers. Block copolymers having such small amounts of methacrolein dimer would be expected to have melting points much closer to that of the homopolymer derived from trioxane and to have a narrower melting range.

Because of the width of melting range of our copolymers, the conditions required for moulding or otherwise fabricating them in massive form are not as critical as those required for the homopolymer and they lend themselves, therefore, to easier fabrication and are of particular interest for film-forming compositions. These copolymers, therefore, are commercially more attractive as moulding materials than the homopolymers.

The rate of thermal degradation of the copolymers, particularly of those which have been stabilised by the methods described, is substantially less than that of the homopolymer. For example, the rate of loss in weight at 222° C. of a homopolyoxymethylene derived from trioxane is about 3% per minute while the equivalent rates for our copolymers containing about 1% or more of methacrolein dimer which have been subjected to an ammoniacal wash treatment are generally less than 0.2% per minute and may be as low as 0.02% per minute. (The test for estimating loss in weight was effected by placing a weighted amount of the copolymer in an ampoule having a narrow neck bent through about 180° and open to the atmosphere and immersing the ampoule so that about its lower two-thirds were immersed in the vapours of boiling methyl salicylate. The ampoule is removed at regular timed intervals, cooled in ice and reweighed and the cycle is repeated. The tests are carried out over a period of at least 20 minutes, generally at least 100 minutes. Some of the tests were carried out under an atmosphere of nitrogen.) This surprising stability at temperatures well in excess of their melting points makes these copolymers suitable in the manufacture of articles which may be subjected during their life to elevated temperature (for example as insultants in electrical switch gear).

Our copolymers containing at least 90 molar percent of oxymethylene groups are tough and dimensionally stable at or above room temperature and their very low rate of thermal degradation makes them particularly useful as moulding materials (e.g., for use in injection moulding, compression moulding and extrusion processes) and for the melt-spinning and casting of fibres and films. We prefer our mouldable polymers to melt at about 140 to 150° C.

The copolymers may also be solvent cast to give films or solvent spun to give fibres from suitable solvents, examples of which are o- and p-chlorophenol, benzyl alcohol and α-naphthol.

These polymers may be used, for example, in the light engineering industry for the manufacture of small gears, roller bearings, bushes, clips and cams; in the motor industry for the manufacture of dust covers or caps for grease nipples and bearings such as track-rod joints, lamp covers, instrument housings, low stressed gears such as oil pump gears, speedometer gears and windscreen wiper gears, self-lock nuts and other small mouldings. Our copolymers containing lesser amounts of oxymethylene groups have reduced strength, rigidity and softening point, but are suitable as plasticisers, lubricants, etc. Because of the presence of carbonyl groups in the polymeric chain, our polymers are suitable in applications where chemical modification of the products is desirable and in applications (for example in the coating of metals) where their enhanced adhesiveness is an advantage.

The invention is illustrated by the following examples in which all parts are expressed as parts by weight.

Example I

In a dry three-necked glass vessel fitted with a stirrer, a nitrogen inlet and outlet and a rubber seal for injection of catalyst, was prepared a solution of 52.8 parts of dry trioxane and 3.7 parts of freshly distilled dry methacrolein dimer in 53 parts of cyclohexane which had been distilled from calcium hydride. The solution was maintained at 61° C. in a water bath and 2 parts of a 1.3% boron trifluoride dibutyl etherate solution in cyclohexane were injected. A pale brown colour developed immediately and 40 minutes later polymer began to be deposited. After 4 hours the mixture was quite thick and 0.1 part of tri-n-butylamine was added. Stirring was continued for ½ hour and then the product was filtered off, washed with acetone and dried to give 16.9 parts of copolymer. 10 parts of the copolymer were heated under pressure for ½ hour at 150° C. with 200 parts of methanol, 150 parts of water and 3.5 parts of .880 ammonia, cooled rapidly, washed with water and dried to give 6.5 parts of a pale brown polymer having a breakdown rate at 222° C. of 0.28% per minute.

Example II 31.7 parts of trioxane which had been refluxed with sodium and then distilled from sodium and 7.4 parts of dry methacrolein dimer were mixed in a dry glass vessel fitted with a nitrogen inlet and a rubber injection seal and protected from the atmosphere by a calcium chloride tube. The mixture was held at 90° C. in an oil bath and 0.039 part of boron trifluoride diethyl etherate in 1 part of diethyl ether was injected into the melt. Polymerisation started immediately and in a few minutes the contents of the vessel were solid. After 10 minutes the vessel was cooled and the polymer was ground up with acetone and then dried for 16 hours at 60° C. under vacuum to yield 21.3 parts of a very pale brown powder. Twenty parts of this powder were refluxed for 2½ hours with 200 parts of methanol, 200 parts of water and 10 parts of .880 ammonia and then washed with 200 parts of distilled water. After drying at 60° C. under vacuum 13 parts of polymer were recovered. At 222° C. it lost 9% of its weight at 0.9% per minute and thereafter its rate of degradation was 0.04% per minute. Infra-red examination showed the presence of methacrolein dimer which had copolymerised through its double bond and not through its carbonyl bond. A film compression moulded at 185° C. showed a granular spherulitic texture of average size 80 microns. The crystal structure melted gradually over the range 130 to 155° C. whereas a homopolyoxymethylene prepared under similar conditions omitting the ammoniacal treatment melts sharply at 170° C. The polymer had an I.V. in p-chlorophenol of 1.05 and could be melt-spun at 190° C. to form strong fibres.

Examples 3 to 10

A series of copolymerisations were effected under the conditions of Example 2. In each case the copolymer obtained was treated with an ammoniacal solution as described in Example 2 and tests were made on the final product, the results of which are tabulated below.

| Example | Amount of monomer in polymerisation [1] | Amount of monomer in copolymer [2] | Melting range, °C. | Degradation rate at 222° C. (Percent/min.) |
|---|---|---|---|---|
| 3 | 1 | 1 | 142–160 | 0.06 |
| 4 | 2.5 | 2.7 | 140–162 | 0.02 |
| 5 | 9.5 | 3.5 | 124–151 | 0.01 |
| 6 | 5 | 5 | 121–147 | 0.01 |
| 7 | 10 | 5.5 | 130–153 | 0.007 |
| 8 | 8.5 | 5.8 | 131–153 | 0.014 |
| 9 | 7.5 | 7.5 | 110–140 | 0.015 |
| 10 | 9 | | 118–164 | 0.013 |

[1] Measured in mole percent of the total amount of formaldehyde (as trioxane) and methacrolein dimer present in the polymerisation mixture.
[2] Measured as percent of recurring units in the copolymer by infra-red analysis.

I claim:
1. In a process which comprises polymerizing trioxane in the presence of a cationic initiator under substantially anhydrous conditions, the improvement of adding to the polymerization mixture from 0.003 to 3 moles per mole of trioxane of methacrolein dimer.
2. A process according to claim 1 which comprises reacting at a temperature of from 50 to 90° C. a mixture comprising (i) trioxane, (ii) from three one-thousandths to one-third of a mole of methacrolein dimer per mole of trioxane and (iii) from 0.0001 to 0.1 part of active constituent per 100 parts of the mixture of trioxane and methacrolein dimer of a cationic initiator selected from the group consisting of boron trifluoride and complexes of boron trifluoride with Lewis bases and thereafter recovering a normally solid copolymer.
3. A rigid moldable random copolymer of trioxane and methacrolein dimer having a molecular weight of at least 15,000, substantially insoluble in cold water but appreciably soluble in p-chlorophenol, said copolymer consisting of 90 to 99.5% of oxymethylene units and 0.5 to 10% of 6-formyl-3,6-dimethyltetrahydropyran-2,3-diyl units.
4. A copolymer according to claim 3 which consists of 95 to 98.5% of oxymethylene units and 1.5 to 5% of 6-formyl-3,6-dimethyltetrahydropyran-2,3-diyl units.
5. A copolymer according to claim 3 which is substantially free from terminal oxymethylene hydroxide units.
6. A copolymer according to claim 4 which is substantially free from terminal oxymethylene hydroxide units.

References Cited by the Examiner

UNITED STATES PATENTS

| 2,537,921 | 1/1951 | Smith | 260—88.3 |
| 2,640,815 | 6/1953 | Whetstone et al. | 260—67 |
| 2,848,437 | 8/1958 | Langsdorf et al. | 260—67 |
| 2,964,500 | 12/1960 | Jenkins et al. | 260—67 |
| 2,989,505 | 6/1961 | Hudgin et al. | 260—67 |
| 3,027,352 | 5/1962 | Walling et al. | 260—67 |
| 3,087,913 | 4/1963 | Kray et al. | 260—73 |

FOREIGN PATENTS

| 1,258,138 | 2/1961 | France. |
| 1,264,823 | 5/1961 | France. |

OTHER REFERENCES

Derwent Belgian Patents Report, vol. 72A (Feb. 10, 1961), p. C8, For. Pat. Jor.

Kern et al.: Angewandte Chemie, 73, No. 6 (March 21, 1961), pp. 177–186.

SAMUEL H. BLECH, *Primary Examiner.*

W. H. SHORT, *Examiner.*

L. M. MILLER, *Assistant Examiner.*